(12) United States Patent
Pletincx

(10) Patent No.: US 11,530,825 B2
(45) Date of Patent: Dec. 20, 2022

(54) PROCESS AND INSTALLATION FOR COOLING AIR-CONDITIONING WATER BY HEAT EXCHANGE WITH CRYOGENIC LIQUIDS

(71) Applicant: L'Air Liquide, Société Anonyme pour l'Etude et l'Exploitation des Procédés Georges Claude, Paris (FR)

(72) Inventor: Ben Pletincx, Dworp (BE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 302 days.

(21) Appl. No.: 16/848,339

(22) Filed: Apr. 14, 2020

(65) Prior Publication Data
US 2020/0333026 A1    Oct. 22, 2020

(30) Foreign Application Priority Data
Apr. 16, 2019 (EP) ..................... 19169453

(51) Int. Cl.
*F17C 7/04* (2006.01)
*F24F 5/00* (2006.01)

(52) U.S. Cl.
CPC .............. *F24F 5/0021* (2013.01); *F17C 7/04* (2013.01); *F17C 2221/011* (2013.01); *F17C 2221/014* (2013.01); *F17C 2223/013* (2013.01); *F17C 2227/0393* (2013.01)

(58) Field of Classification Search
CPC ................... F24B 19/005; F24F 5/0035; F24F 2005/0035; F24F 5/0021; F17C 7/04
See application file for complete search history.

(56) References Cited

U.S. PATENT DOCUMENTS

| 3,385,073 | A | * | 5/1968 | Snelling | .................. F25D 3/105 62/239 |
| 3,662,561 | A | | 5/1972 | Schroeder | |
| 5,960,635 | A | * | 10/1999 | Dakhil | .................. F24F 5/0007 62/48.1 |
| 2004/0016245 | A1 | * | 1/2004 | Pierson | ..................... F24F 3/06 62/175 |
| 2015/0090116 | A1 | * | 4/2015 | Edwards | ............ B01D 53/0454 96/111 |

FOREIGN PATENT DOCUMENTS

| CA | 2 472 752 | 12/2004 |
| CN | 108 344 089 | 7/2018 |
| EP | 0 757 212 | 2/1997 |
| KR | 2016 0086532 | 7/2016 |

OTHER PUBLICATIONS

European Search Report for corresponding EP 19169453, dated Sep. 17, 2019.

* cited by examiner

*Primary Examiner* — Brian M King
(74) *Attorney, Agent, or Firm* — Allen E. White

(57) ABSTRACT

The invention relates to a process for cooling air-conditioning water used to air-condition a hospital building, comprising the steps of: (a) providing nitrogen in liquid form (LIN); (b) providing oxygen in liquid form (LOX); (c) providing air-conditioning water to be cooled; and (d) performing a heat exchange (4) between the air-conditioning water to be cooled and the nitrogen in liquid form (LIN) and/or the oxygen so as to cool the air-conditioning water and to vaporize the nitrogen and/or the oxygen and obtain nitrogen in gaseous form (GAN) and/or oxygen in gaseous form (GOX).

7 Claims, 2 Drawing Sheets

PROCESS AND INSTALLATION FOR COOLING AIR-CONDITIONING WATER BY HEAT EXCHANGE WITH CRYOGENIC LIQUIDS

CROSS REFERENCE TO RELATED APPLICATIONS

This application claims the benefit of priority under 35 U.S.C. § 119 (a) and (b) to European Patent Application No. 19169453, filed Apr. 16, 2019, the entire contents of which are incorporated herein by reference.

BACKGROUND

The invention relates to a process and a facility for cooling air-conditioning water, i.e. cooling water, used for air-conditioning a hospital building, that is to say hospital, clinic, a care structure or the like.

Many buildings, in particular hospital buildings, have an air-conditioning system which is used to cool, i.e. to air-condition, the various rooms or other areas of these buildings, such as treatment rooms, operating theatres, rooms occupied by patients, reception, waiting rooms, corridors, etc.

Ice-cold water is also used to regulate the hygrometry since, when the air is cooled, it is dehumidified.

An air-conditioning system generally uses a central air-conditioning device or air-conditioner which is used to cool and distribute a cooling fluid, typically cooling water, such as water mixed with glycol, within the building to be air-conditioned, via a network of pipes operating in a closed circuit, that is to say in a loop. The cooling fluid is used to cool the rooms occupied by patients and the technical environments by means of cooling ceilings and cold heat exchangers in air treatment plants (ATPs).

However, air-conditioners are fitted with compressors that consume high amounts of electricity and have a maximum yield (COP) of 3 to 1, that is say that they require a large amount of electricity to cool the cooling fluid, prior to being sent back into the network of pipes distributing the fluid.

Consequently, the problem is that of being able to reduce the energy consumption, that is so the electricity consumption, of an air-conditioning system placed in a hospital building.

SUMMARY

The solution therefore relates to a process for cooling air-conditioning water used to air-condition a hospital building, comprising the steps of:
  a) providing nitrogen in liquid form (LIN),
  b) providing oxygen in liquid form (LOX),
  c) providing air-conditioning water to be cooled, and
  d) performing a heat exchange between the air-conditioning water to be cooled and the nitrogen in liquid form (LIN) and/or the oxygen so as to cool the air-conditioning water and to vaporize the nitrogen and/or the oxygen and obtain nitrogen in gaseous form (GAN) and/or oxygen in gaseous form (GOX).

In the context of the present invention, the following abbreviations and definitions are used:
  LIN denotes nitrogen in liquid form,
  LOX denotes oxygen in liquid form,
  GAN denotes nitrogen in gaseous form,
  GOX denotes oxygen in gaseous form,
  "water to be cooled" denotes the water before heat exchange with the LIN and the LOX,
  "cold water" or "cooled water" denotes the water after it has been called by heat exchange with the LIN and the LOX,
  "medical air" denotes a gaseous mixture formed at least of nitrogen and oxygen (i.e. $N_2/O_2$),
  "air-conditioning water" or "cooling water" denotes the water of the air-conditioning network, for example water mixed with glycol, or the like.

Depending on the embodiment considered, the process of the invention may comprise one or more of the following features:
  the nitrogen in liquid form (LIN) is provided by one (or more) nitrogen pipe,
  the oxygen in liquid form (LOX) is provided by one (or more) oxygen pipe,
  the air-conditioning water is provided by one (or more) first air-conditioning water pipe,
  in step d), a heat exchange is performed between the air-conditioning water conveyed by the first air-conditioning water pipe and the nitrogen in liquid form (LIN) and/or the oxygen in liquid form (LOX) conveyed by the nitrogen pipe and/or oxygen pipe,
  the nitrogen in liquid form (LIN) is delivered by a liquid nitrogen source,
  the oxygen in liquid form (LOX) is delivered by a liquid oxygen source,
  a heat exchange is performed between the air-conditioning water and, moreover, the nitrogen in liquid form (LIN) and/or the oxygen in liquid (LOX) so as to cool the air-conditioning water and to vaporize the nitrogen and/or the oxygen and obtain nitrogen in gaseous form (GAN) and/or oxygen in gaseous form (GOX),
  preferably, a heat exchange is performed between the air-conditioning water and, moreover, the LIN and the LOX,
  the air-conditioning water to be cooled is the cooling water used to air-condition at least one portion of the hospital building, in particular at least one part of the operating theatres, the treatment rooms, the rooms occupied by patients, the corridors, etc.,
  the air-conditioning water is water mixed with glycol, that is to say water to which glycol has been added,
  the air-conditioning water is conveyed within an air-conditioning system comprising water pipes, one or more circulation pumps, one or more compressors and at least one expansion chamber used to mechanically cool the air-conditioning water,
  the air-conditioning system is in a closed circuit, that is to say it operates in the loop,
  the first air-conditioning water pipe is connected to the air-conditioning system of said building, that is to say that the water to be called comes from the air-conditioning system,
  in step d), the air-conditioning water is cooled to a temperature of less than 12° C., preferably less than 10° C., more preferably less than 8° C., typically between 2 and 6° C.,
  the liquid nitrogen source is a liquid nitrogen storage tank, preferably having a capacity of at least 5000 litres,
  the liquid oxygen source is a liquid oxygen storage tank, preferably having a capacity of at least 3000 litres,
  the liquid nitrogen source and/or the liquid oxygen source are arranged outside the hospital building, preferably in immediate proximity to the building, for example next to the building, in step d), gaseous oxygen (GOX) and/or gaseous nitrogen (GAN) are obtained by reheating and vaporizing the liquid oxygen (LOX) and/or the liquid nitrogen (LIN), advantageously, in step d), gaseous oxygen and nitrogen are obtained by reheating and vaporizing the liquid oxygen and the liquid nitrogen, in step d), a counter-current heat exchange is performed, that is to say a heat exchange where the water circulates in a direction opposite the direction of the circulation of the nitrogen and oxygen in the pipes conveying them, in step d), a heat exchange is performed within at least one heat exchanger, in step d), a heat exchange is performed by transfer of heat from the water to be cooled to the LIN and the LOX so as to reheat the LIN and the LOX and to form GAN and GOX, in step d), a heat exchange is performed by transfer of cold from the LIN and the LOX to the water to be cooled so as to cool the water, that is to say lower its temperature, before cooling, the water to be cooled, conveyed by the first water pipe, is at a temperature of at least 6° C., preferably of at least 8° C., more preferably of at least 10° C., typically of between 8 and 12° C., mixing of at least one portion of the gaseous oxygen (GOX) obtained in step d) with gaseous nitrogen (GAN) obtained in step d) is moreover performed so as to produce medical air, Le, a gaseous $N_2/O_2$ mixture, the mixing of gaseous oxygen and gaseous nitrogen obtained in step d) used to produce medical air is performed within one (or more) gas mixer, the gas mixer is in fluidic communication with (at least) one medical-air pipe used to recover and convey the medical air obtained, the medical-air pipe is fluidically connected to the medical-air network of the hospital building so as to be able to supply the medical-air network of the hospital building with medical air, the medical-air network of the hospital building is supplied with the medical air produced by mixing gaseous oxygen and gaseous nitrogen obtained in step d), at least one portion of the liquid nitrogen (LIN) originating from the liquid nitrogen source is supplied to an additional nitrogen vaporizer so as to produce gaseous nitrogen (GAN) by vaporization of the LIN, at least one portion of the liquid oxygen (LOX) delivered by the liquid oxygen source is supplied to an additional oxygen vaporizer so as to produce gaseous oxygen (GOX) by vaporization of the LOX, the gaseous nitrogen and the gaseous oxygen produced by the additional nitrogen vaporizer and by the additional oxygen vaporizer are recovered, and the gas mixer is supplied with at least one portion of the gaseous nitrogen and the gaseous oxygen thus recovered so as to produce medical air within said gas mixer, that is to say a mixture gaseous nitrogen and gaseous oxygen, at least one portion of the gaseous oxygen produced by the additional oxygen vaporizer is moreover recovered for supplying an oxygen pipe network of the hospital building so as to supply gaseous oxygen to the various areas or rooms of the building where oxygen is likely to be used, in particular the treatment rooms, operating theatres, rooms occupied by patients, etc., at least one portion of the gaseous oxygen produced by the additional oxygen vaporizer is recovered, within an additional oxygen pipe fluidically connected to the oxygen the pipe network of the hospital building.

Moreover, the invention also relates to a facility for cooling the air-conditioning water used to air-condition at least one portion of a hospital building, comprising:

a first water pipe conveying air-conditioning water to be cooled, (at least) one nitrogen pipe conveying nitrogen in liquid form (LIN) originating from a liquid nitrogen source, (at least) one oxygen pipe conveying oxygen in liquid form (LOX) originating from a liquid oxygen source, heat exchanger means arranged so as to perform a heat exchange between the air-conditioning water to be cooled, provided by the first water pipe, and the liquid oxygen and/or the liquid nitrogen provided by said nitrogen pipe and/or oxygen pipe, so as:

to cool the air-conditioning water, i.e. the air-conditioning water provided by the first water pipe, and to reheat and vaporize the liquid oxygen and/or the liquid nitrogen, i.e. the LOX and the LIN, provided by said nitrogen pipe and/or oxygen pipe, and to obtain nitrogen (GAN) and oxygen (GOX) in gaseous form.

Depending on the embodiment considered, the cooling facility of the invention may comprise one or more of the following features:

the heat exchanger means comprise one or more heat exchangers, preferably of counter-current type, the liquid nitrogen source is a liquid nitrogen storage tank and/or the liquid oxygen source is a liquid oxygen storage tank, the liquid nitrogen source and/or the liquid oxygen source are placed outside the building, it comprises (at least) a second cooled-water pipe fluidically connected to the heat exchanger means and to the air-conditioning system of the building, distributing the cooled water to the air-conditioning network of the building, the second cooled-water pipe conveys the "cold" water originating from the thermal exchanger means to the air-conditioning system, the air-conditioning system and the air-conditioning network are arranged in the building so as to make it possible to cool at least one portion of the operating theatres, the treatment rooms, the rooms occupied by patients, the corridors, the technical areas, the mortuary and the dehumidifying devices, the air-conditioning network is a closed circuit, the air-conditioning system comprises water pipes, La an air-conditioning network, one or more circulation pumps, one or more compressors and at least one expansion chamber, the air-conditioning system is configured to mechanically cool the air-conditioning water, it also comprise a nitrogen vaporizer and an oxygen vaporizer which are supplied, respectively, by the LIN source and the oxygen source, preferably via LIN and LOX supply lines, respectively, fluidically connecting the LIN source 10 and LOX source 20 to said gas vaporizers, the nitrogen vaporizer is designed to vaporize the LIN and to produce gaseous nitrogen and the oxygen vaporizer is designed to vaporize the LOX and to produce gaseous oxygen, a gaseous nitrogen supply line and a gaseous oxygen supply line fluidically connect the nitrogen and oxygen vaporizers to the gas mixture so as to supply said gas mixer with gaseous nitrogen and gaseous oxygen produced in the nitrogen and oxygen vaporizers, a bypass line fluidically connects the oxygen vaporizer to an oxygen pipe network of the hospital building so as to supply gaseous oxygen to the various areas or rooms of the building where oxygen is likely to be used, in particular the treatment rooms, operating theatres, rooms occupied by patients, etc.

BRIEF DESCRIPTION OF THE DRAWINGS

The invention will now be better understood from the following detailed description given as a non-limiting example and with reference to the appended figures, in which.

DETAILED DESCRIPTION OF THE PREFERRED EMBODIMENTS

Figure 1:
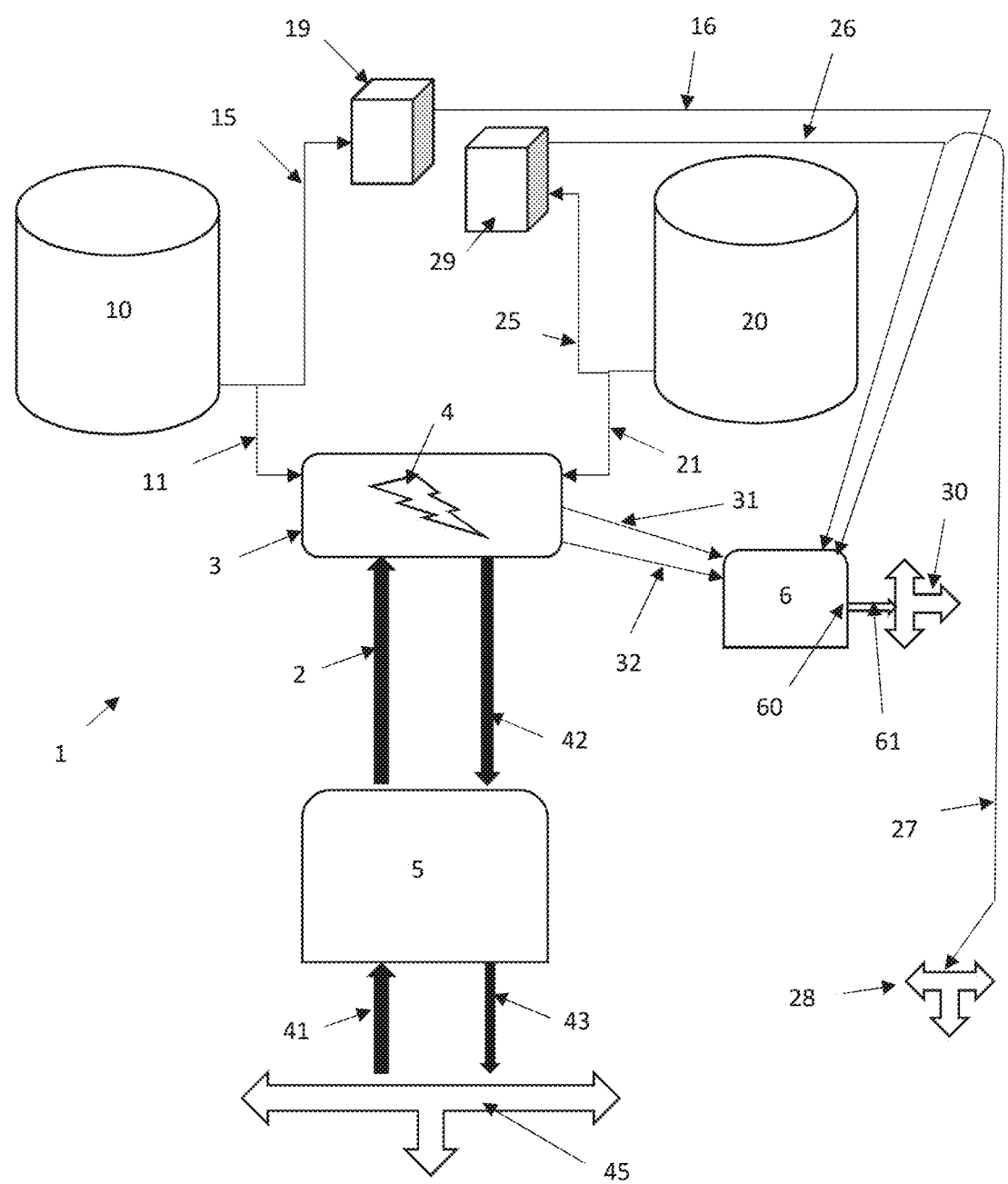
FIG. 1 diagrammatically shows a facility according to the invention.

FIG. 1 diagrammatically shows a facility 1 which makes it possible to cool the air-conditioning water, i.e. the cooling water, used to air-condition all or a portion of a hospital building, that is to say of the operating theatres, treatment rooms, rooms occupied by patients, corridors, technical areas, etc., of a hospital, of a clinic, of a care structure or the like, via an air-conditioning network 45 fluidically connected to the air-conditioning system 5.

This facility 1 comprises a first water pipe 2 conveying air-conditioning water to be cooled, typically water mixed with glycol, and supplied with water by an air-conditioning system 5 comprising circulation pumps and compressors and at least one expansion chamber in order to mechanically cool the air-conditioning water, which system is fluidically connected to the air-conditioning network 45 of the building, via a water return line 41 and a cooled-water supply line 43, i.e. ducts. The air-conditioning network 45 operates in a closed circuit (in a loop), that is to say that the "cold" water (approx. 4° C.) is sent to the air-conditioning network 45 of the building via the water supply line 43, and the "reheated" water (approx. 8° to 12° C.) and then returns to the air-conditioning system 5 via the water return line 41.

The first water pipe 2 brings the water to heat exchangers 3, for example one or more heat exchangers which make it possible to carry out heat exchanges by transfer of heat/cold (i.e. negative heat) between the water, and the nitrogen and oxygen in liquid form.

Nitrogen in liquid form (LIN) originating from a liquid nitrogen source 10, such as a liquid nitrogen tank, e.g. of at least 5000 l, located outside the building, is conveyed, via a liquid nitrogen pipe 11, to the heat exchanger means 3. Similarly, oxygen in liquid form (LOX) originating from a liquid oxygen source 20, such as a liquid oxygen tank, e.g. of at least 3000 l, also located outside the building, is conveyed, via a liquid oxygen pipe 21, to the heat exchanger means 3.

The heat exchanger means 3 are designed to perform a heat exchange (in 4) between the water to be cooled that is provided by the first water pipe 2, and the LOX and LIN that are provided by said nitrogen pipe 11 and oxygen pipe 21 so as to cool the water provided by the first water pipe 2 and, moreover, to reheat the LOX and LIN and thus to vaporize them in order to obtain oxygen and nitrogen in gaseous form, i.e. GOX et GAN.

Typically, before cooling, the air-conditioning water to be cooled is at a temperature of at least 8 to 10° C., whereas after cooling, the cooled air-conditioning water is at a temperature below that of the water to be cooled, that is to say at a temperature of less than 10° C., in general less than or equal to 8° C., typically between 2 and 6° C.

Figure 2:
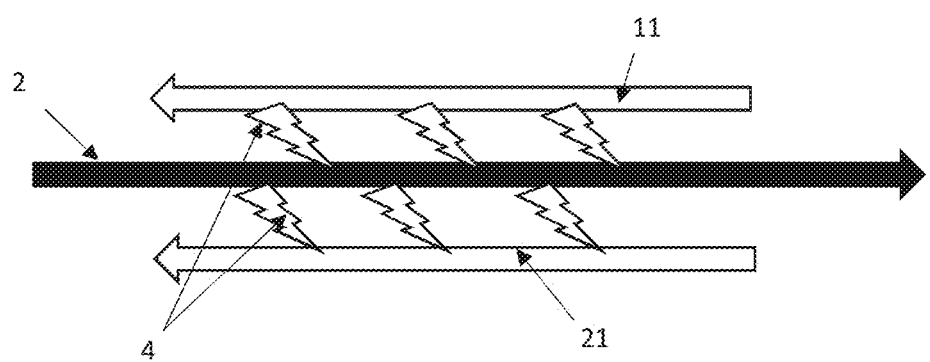
FIG. 2 shows a counter-current heat exchange.

Advantageously, the heat exchange is performed in countcurrent mode in the heat exchanger means 3, as shown in FIG. 2, by transfer of heat/cold between the LIN pipe 11, the LOX pipe 21 and, moreover, the pipe carrying water to be cooled 2. The direction of circulation of the LIN, LOX and water streams is given by the direction of the arrows. As is seen, the water circulates in a direction opposite the direction of circulation of nitrogen and oxygen within the pipes 2, 11, 21 conveying them.

Once cooled within the heat exchanger means 3, typically a heat exchanger, the "cold" water, that is to say the water typically at a temperature of the order of 4° to 6° C., is sent back, by a second water pipe 42, to the thermal heat exchangers 3 where the water cooled by the exchange 3 is mixed with water cooled directly in the air-conditioning system 5, consequently limiting the energy consumption of the air-conditioning assembly 5.

Moreover, the GOX and GAN generated by vaporization within the heat exchanger means 3 are recovered and these gases are conveyed to a gas mixer 6 via gas ducts 31, 32 fluidically connecting the heat exchanger means 3 to the gas mixer 6, as shown in FIG. 1.

The GOX and GAN are then mixed within the gas mixer 6 so as to produce medical air, that is to say a gaseous mixture formed of nitrogen and oxygen, i.e. an $N_2/O_2$ mixture.

The gas mixer 6 comprises, moreover, an air outlet in fluidic communication with (at least) one medical-air pipe 61 used to recover the medical air produced in the gas mixer 6. This medical-air pipe 61 is fluidically connected to the medical-air network 30 of the hospital building so as to supply, to said air network 30, the $N_2/O_2$ mixture produced within the gas mixer 6.

Moreover, it is seen in FIG. 1 that the facility 1 also comprises two additional backup atmospheric gas vaporizers 19, 20 in case of breakdown of the heat exchanger means 3 or in case there is a problem in the supply of and/or with the pipe carrying, water to be cooled 2, 42.

More specifically, it preferentially involves an additional backup atmospheric nitrogen vaporizer 19 and an additional backup oxygen vaporizer 29 which are supplied, respectively, by the LIN source 10 and the oxygen source 20, via LIN supply line 15 and LOX supply line 25, respectively, fluidically connecting the LIN source 10 and LOX source 20 to said additional gas vaporizers 19, 29.

The nitrogen vaporizer 19 makes it possible to vaporize the LIN so as to produce gaseous nitrogen or GAN and, similarly, the oxygen vaporizer 29 makes it possible to vaporize the LOX so as to produce gaseous oxygen or GOX, by exchange with the atmospheric ambient temperature. The GAN and the GOX thus obtained are then conveyed in gaseous form, via GAN line 16 and GOX line 26, to the gas mixer 6 so as to produce medical air by mixing of gaseous nitrogen and oxygen which can then supply the air network 30 of the hospital building, as already explained above.

The vaporized gaseous oxygen can also directly supply, via a bypass line 27 for example, an oxygen pipe network 28 of the hospital building used to convey oxygen to various areas or rooms of the building where oxygen is likely to be used, in particular the treatment rooms, operating theatres, rooms occupied by patients, etc.

Of course, the facility 1 of the invention also comprises valve means (not shown), such as solenoid valves, or other flow control elements (not shown), such as non-return valves or the like, arranged on the pipes of the facility 1 so as to regulate or control the oxygen, nitrogen, air and water streams circulating in said pipes of the facility 1 and to activate, if required, said bypasses by the backup network, that is to say the line 15, 25, in order to guarantee the continuity of supply of GAN and of medical air at the outlet of the exchanger means 6.

A control unit (not shown) makes it possible to control the operation of the facility 1 of the invention, in particular the opening or closing of the valve means or the like.

The installation 1 of the invention is supplied with electricity by the electrical network or the like.

The process and the facility of the invention are particularly efficient for cooling the air-conditioning water circulating in the air-conditioning system of a hospital building, that is to say of a hospital, clinic, of a care structure or the like, and make it possible to carry out a notable reduction in the electrical consumption of said air-conditioning system of the hospital building.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A cooling facility (1) for cooling the air-conditioning water for air-conditioning at least one portion of a hospital building, comprising:
    a first water pipe (2) for air-conditioning water to be cooled,
    a nitrogen pipe (11) connected to a liquid nitrogen source (10) supplying nitrogen in liquid form (LIN),
    an oxygen pipe (21) connected to a liquid oxygen source (20) supplying oxygen in liquid form (LOX),
    heat exchanger (3) configured and adapted to perform a heat exchange (4) between the air-conditioning water to be cooled, provided by the first water pipe (2), and the liquid oxygen and/or the liquid nitrogen provided by said nitrogen pipe (11) and oxygen pipe (21), so as to cool the air-conditioning water and to vaporize the liquid oxygen and/or the liquid nitrogen and to thereby obtain nitrogen and/or oxygen in gaseous form,
    an atmospheric nitrogen vaporizer (19) and an atmospheric oxygen vaporizer (29) which are fluidically connected so as to be capable of being supplied, respectively, by the LIN source (10) and the oxygen source (20).

2. The cooling facility according to claim 1, characterized in that the liquid nitrogen source (10) is a liquid nitrogen storage tank and the liquid oxygen source (20) is a liquid oxygen storage tank.

3. The cooling facility according to claim 2, characterized in that the cooling facility further comprises a second cooled water pipe (42) fluidically connected to the heat exchanger (3) and to an air-conditioning system (5) for a second hospital building.

4. The cooling facility according to claim 2, characterized in that the cooling facility further comprises a hospital building with an air-conditioning network (45) and the air-conditioning system (5) is connected so as to supply the air-conditioning network (45) of the hospital building with cooled water originating from the heat exchanger (3).

5. The cooling facility according to claim 1, characterized in that the atmospheric nitrogen vaporizer (19) is designed to vaporize the LIN and to produce gaseous nitrogen and the atmospheric oxygen vaporizer (29) is designed to vaporize the LOX and to produce gaseous oxygen.

6. The cooling facility according to claim 1, characterized in that a gaseous nitrogen supply line (16) and a gaseous oxygen supply line (26) fluidically connect the atmospheric nitrogen vaporizer (19) and the atmospheric oxygen vaporizer (29) to a gas mixer (6).

7. The cooling facility according to claim 1, characterized in that the cooling facility also comprises a hospital building, and a bypass line (27) fluidically connects the atmospheric oxygen vaporizer (29) to an oxygen pipe network (28) of the hospital building.

* * * * *